(12) United States Patent
I

(10) Patent No.: US 12,134,191 B2
(45) Date of Patent: Nov. 5, 2024

(54) ROBOT SYSTEM

(71) Applicant: FANUC CORPORATION, Yamanashi (JP)

(72) Inventor: Kouta I, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 17/999,844

(22) PCT Filed: Jun. 17, 2021

(86) PCT No.: PCT/JP2021/023073
§ 371 (c)(1),
(2) Date: Nov. 23, 2022

(87) PCT Pub. No.: WO2021/261378
PCT Pub. Date: Dec. 30, 2021

(65) Prior Publication Data
US 2023/0173668 A1 Jun. 8, 2023

(30) Foreign Application Priority Data

Jun. 24, 2020 (JP) .................................. 2020-108600

(51) Int. Cl.
*B25J 13/08* (2006.01)
*B25J 9/16* (2006.01)
(Continued)

(52) U.S. Cl.
CPC .......... *B25J 9/1612* (2013.01); *B25J 9/1697* (2013.01); *B25J 13/08* (2013.01); *G06T 7/73* (2017.01);
(Continued)

(58) Field of Classification Search
CPC .. G06T 7/73; G06T 2207/10028; B25J 13/08; B25J 9/1612; B25J 9/1697; B25J 9/1687;
(Continued)

(56) References Cited

U.S. PATENT DOCUMENTS

| 11,931,107 | B1* | 3/2024 | Janna | .............. | A61B 90/36 |
| 2012/0078418 | A1* | 3/2012 | Borrn | .............. | B25J 9/1692 |
| | | | | | 700/254 |

(Continued)

FOREIGN PATENT DOCUMENTS

| JP | H09-255158 A | 9/1997 |
| JP | 2013-154457 A | 8/2013 |
| WO | 2017/033254 A1 | 3/2017 |

OTHER PUBLICATIONS

Madokoro et al., Unsupervised feature selection and category formation for mobile robot vision, 2011, IEEE, p. 320-327 (Year: 2011).*

(Continued)

*Primary Examiner* — McDieunel Marc
(74) *Attorney, Agent, or Firm* — Studebaker & Brackett PC

(57) ABSTRACT

Provided is a robot system capable of appropriately removing an object that may deform depending on a placement state. A robot system according to the present disclosure is provided with: an imaging apparatus that captures an image of an object; a robot that picks up the object; an image processing apparatus that identifies the position of the object on the basis of the image captured by the imaging apparatus; and a robot controller that causes the robot to pick up the object, the position of which has been identified by the image processing apparatus. The image processing apparatus comprises: a teaching unit that sets a search range in which a feature amount for a pattern on the object in the image captured by the imaging apparatus may be obtained;

(Continued)

a recognition unit that extracts the pattern having the feature amount within the search range in the image captured by the imaging apparatus; and a correction unit that corrects the search range on the basis of the feature amount of the pattern extracted by the recognition unit.

5 Claims, 5 Drawing Sheets

(51) Int. Cl.
*G06T 7/73* (2017.01)
*G06V 10/40* (2022.01)

(52) U.S. Cl.
CPC .... *G06V 10/40* (2022.01); *G06T 2207/10028* (2013.01); *G06V 2201/07* (2022.01)

(58) Field of Classification Search
CPC .............. G06V 10/40; G06V 2201/07; G05B 2219/40006
See application file for complete search history.

(56) References Cited

U.S. PATENT DOCUMENTS

| | | | | |
|---|---|---|---|---|
| 2021/0373565 A1* | 12/2021 | Lee | ............... | G05D 1/648 |
| 2023/0072423 A1* | 3/2023 | Osborn | ............... | G16H 20/30 |
| 2023/0271330 A1* | 8/2023 | Sundaralingam | ........ | B25J 9/163 |
| | | | | 700/246 |
| 2024/0155109 A1* | 5/2024 | Deng | ............ | H04N 19/159 |
| 2024/0189978 A1* | 6/2024 | Asmari | ............ | H01L 31/18 |
| 2024/0241519 A1* | 7/2024 | George | ............ | G06Q 10/087 |

OTHER PUBLICATIONS

Li et al., A method of recognizing objects specified by color and shape in autonomous Robot, 2010, IEEE, p. 2466-2470 (Year: 2010).*
Shin et al., Integration of deep learning-based object recognition and robot manipulator for grasping objects, 2019, IEEE, p. 174-178 (Year: 2019).*
Dongyu et al., Object Detection for Soft Robotic Manipulation Based on RGB-D Sensors, 2018, IEEE, p. 52-58 (Year: 2018).*
International Search Report issued in PCT/JP2021/023073; mailed Sep. 7, 2021.
Okamoto, Akira et al.; "Development of Vision Sensor for Depalletizing Robot"; in particular, "2. Configuration of the depalletizing system" to "4. Recognition of work and outline flow"; Preprints of the 16th Annual Conference of the Robotics society of Japan; Sep. 1998; pp. 883-884; vol. 2.

* cited by examiner

ROBOT SYSTEM

TECHNICAL FIELD

The present invention pertains to a robot system.

BACKGROUND ART

A robot system that uses a robot to pick up a plurality of target objects one-by-one is used. For example, as described in Patent Document 1, a technique that captures an image of a region in which a target object is disposed and extracts, from the captured image, a pattern that matches a feature of the target object to thereby specify the position of the target object, such that it is possible to appropriately pick up the target object in a case where the disposition of the target object is not settled, is publicly known.

Patent Document 1: PCT International Publication No. WO2017/033254

DISCLOSURE OF THE INVENTION

Problems to be Solved by the Invention

In a case where a target object is, for example, a bag-packaged body, etc., the target object can deform in accordance with a placement state. When the amount of deformation of the target object gets large, a pattern (shape recognized using image processing) belonging to the target object in a captured image does not match a set pattern, and thus there is the risk that the presence of the target object will not be able to be detected. For example, in a case where a plurality of bag-packaged bodies are stacked on a pallet, a bag-packaged body disposed on a lower side is squashed from above and deforms such that the planar dimensions thereof increase. Accordingly, when a robot system is taught the shape of a bag-packaged body which is placed in an uncompressed state, there can be cases where it is not possible to appropriately pick up a lower bag-packaged body. Accordingly, a robot system that can appropriately pick up a target object that can deform in accordance with a placement state is required.

Means for Solving the Problems

A robot system according to the present disclosure is provided with: an imaging apparatus configured to capture an image of a target object; a robot configured to pick up the target object; an image processing apparatus configured to, based on the image captured by the imaging apparatus, specify a position of the target object; and a robot controller configured to cause the robot to pick up the target object having the position specified by the image processing apparatus, the image processing apparatus having a teaching unit configured to set a search range in which it is possible to obtain a feature amount for a pattern belonging to the target object in the image captured by the imaging apparatus, a recognition unit configured to extract the pattern having the feature amount within the search range in the image captured by the imaging apparatus, and a correction unit configured to, based on the feature amount for the pattern extracted by the recognition unit, correct the search range.

Effects of the Invention

By virtue of a robot system according to the present disclosure, it is possible to appropriately pick up a target object that can deform in accordance with a placement state.

PREFERRED MODE FOR CARRYING OUT THE INVENTION

Figure 1:
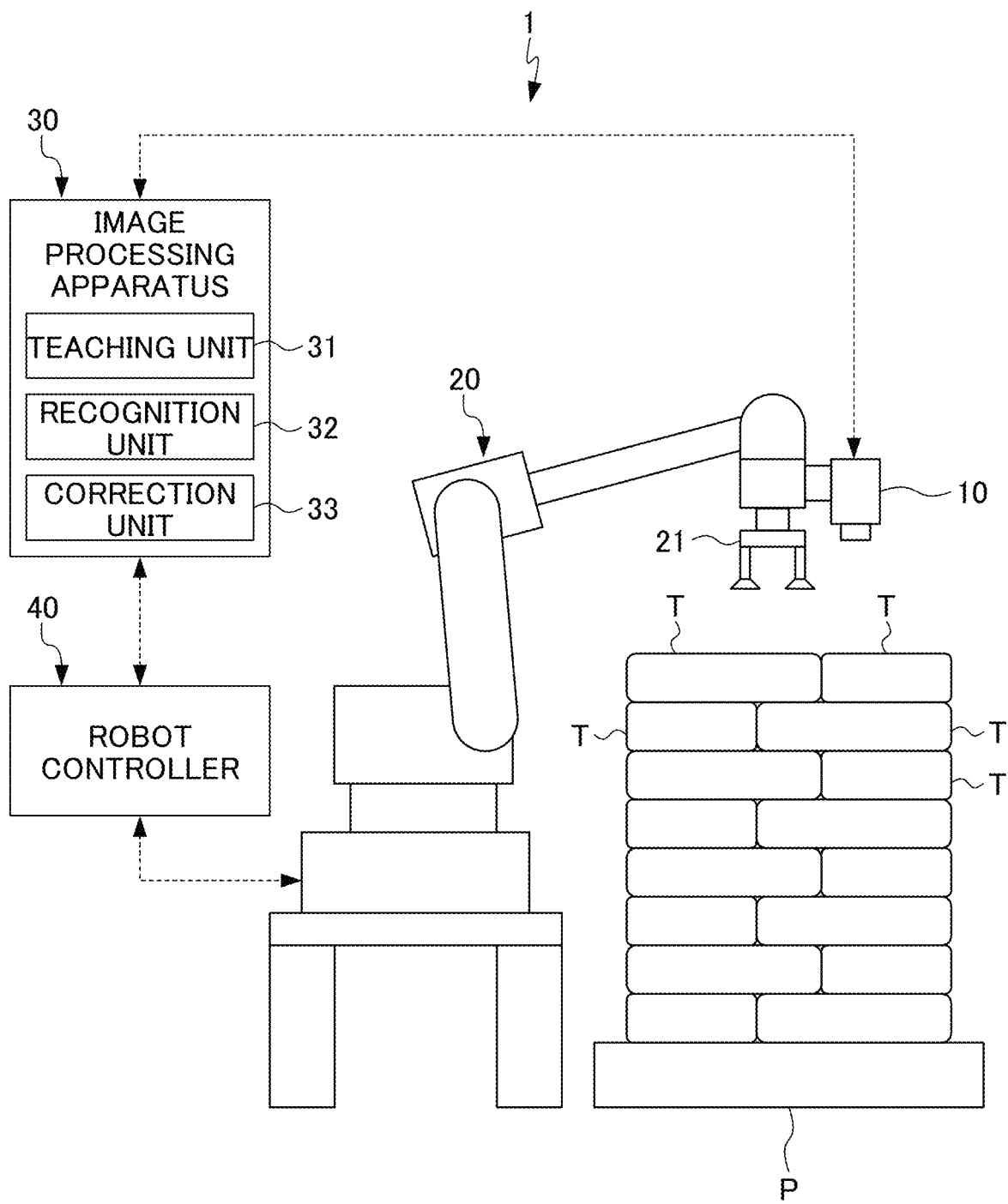
FIG. 1 is a schematic view that illustrates a configuration of a robot system according to one embodiment of the present disclosure.

Description is given below regarding an embodiment according to the present disclosure, with reference to the drawings. FIG. 1 is a schematic view that illustrates a configuration of a robot system 1 according to one embodiment of the present disclosure.

The robot system 1 according to the present embodiment is a depalletizing system that picks up, one at a time, a plurality of target objects T that have been stacked onto a pallet P. For example, a bag-packaged body resulting from bagging a granular material is envisioned as a target object T that the robot system 1 according to the present embodiment picks up.

The robot system 1 is provided with an imaging apparatus 10 that captures an image of a target object T, a robot 20 that picks up the target object T, an image processing apparatus 30 that, based on an image captured by the imaging apparatus 10, specifies the position of the target object T, and a robot controller 40 that causes the robot 20 to pick up the target object T for which the position thereof was specified by the image processing apparatus 30.

The imaging apparatus 10 captures from above a range in which the pallet P is present, in other words a plurality of target objects T on the pallet P, and obtains a captured image with which it is possible to confirm the outline of at least a target object T in an uppermost level. The imaging apparatus 10 may be secured, using a structure such as a trestle, above a location where the pallet P is disposed, but, by the imaging apparatus 10 being held by the robot 20, it is possible to omit a structure for securing the imaging apparatus 10.

Figure 2:
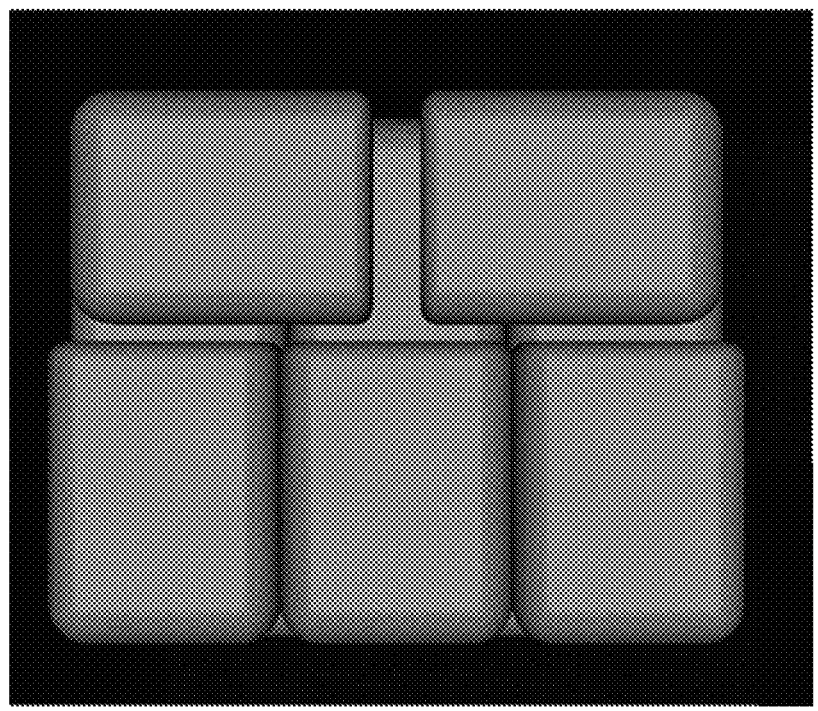
FIG. 2 is a view that exemplifies a captured image in the robot system in FIG. 1.

A captured image obtained by the imaging apparatus 10 may be a visible light image, but, as exemplified in FIG. 2, it is desirable for a captured image to be a distance image that, for each pixel, indicates a distance from the imaging apparatus 10 to a photographic subject. By the imaging apparatus 10 obtaining a distance image for a target object T, a sensor for detecting a height position for the target object T does not need to be separately provided. The imaging apparatus 10 that obtains a distance image has a projector for projecting pattern light onto the entirety of an image capturing range and two cameras that capture, from two different positions, the pattern light projected onto a photographic subject. The imaging apparatus 10 can use a three-dimensional vision sensor that, for each plane position, calculates a distance to the photographic subject from position deviation in pattern light arising due to parallax between the images captured by the two cameras. A component that calculates distances from the images captured by the two cameras to the photographic subject may be provided separately from the projector and the cameras, or may be provided integrally with the image processing apparatus 30 which is described below.

It is possible to have the robot 20 be a typical vertical articulated robot, but the robot 20 may be a scalar robot, a parallel-link robot, a Cartesian coordinate robot, etc. The robot 20 has a holding head 21 that can hold a target object T in a tip end thereof. The holding head 21 is appropriately designed in accordance with the target object T, and, for example, it is possible to have a configuration in which the holding head 21 has a vacuum suction pad that uses suction to grasp the target object T. The holding head 21 may have, for example, a contact sensor that detects contact with the target object T. By the holding head 21 having a contact sensor, it is possible to confirm a height position of a target object T to be picked up.

The image processing apparatus 30 has a teaching unit 31 that sets a search range in which it is possible to obtain a feature amount for a pattern belonging to the target object T in an image captured by the imaging apparatus 10, a recognition unit 32 that extracts a pattern that has a feature amount within the search range in the image captured by the imaging apparatus 10, and a correction unit 33 that, based on the feature amount in the pattern extracted by the recognition unit 32, corrects the search range.

The image processing apparatus 30 can be realized by introducing an appropriate control program into a computer apparatus that has a CPU, a memory, etc. The teaching unit 31, the recognition unit 32, and the correction unit 33 result from classifying functionality for the image processing apparatus 30, and there is no need to be able to clearly separate the functionality and program structure thereof. The image processing apparatus 30 may also be integrally configured with the robot controller 40 which is described below.

The teaching unit 31, before work to pick up a target object T using the robot 20 is actually performed, sets an initial value for a search range (range for determining that a pattern, which includes a feature amount, is a pattern belonging to the target object T) for a feature amount that the recognition unit 32 uses to specify a pattern belonging to the target object T in an image captured by the imaging apparatus 10. Setting of the initial value for the feature amount search range by the teaching unit 31 may be performed for each pallet P, but if load shapes (number and disposition of target objects on a pallet P) are the same, it is possible to omit setting of a feature amount by the teaching unit 31 and reuse the initial value for the feature amount search range. Accordingly, it is desirable for the teaching unit 31 to be able to store, for each load shape for a target object T, an initial value for a feature amount search range.

Figure 3:
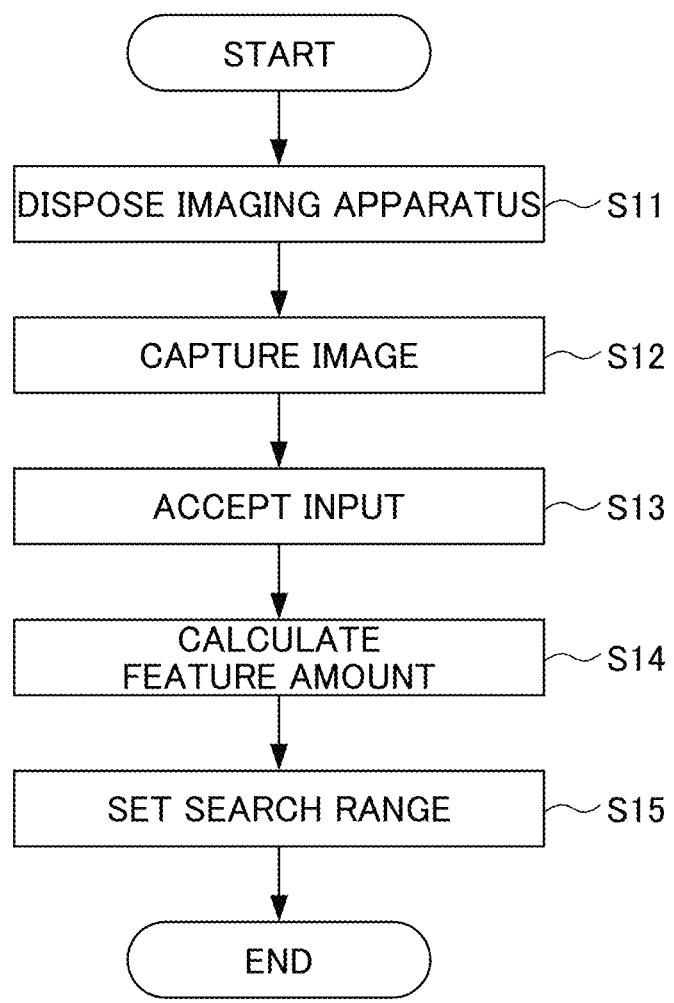
FIG. 3 is a flow chart that illustrates a procedure for a teaching process in the robot system in FIG. 1.

FIG. 3 illustrates a procedure in which the teaching unit 31 sets an initial value for a feature amount search range. Setting of an initial value for a search range includes a step for disposing a target object T within a field of view for the imaging apparatus 10 (Step S11: imaging apparatus disposing step), a step for using the imaging apparatus 10 to capture an image (Step S12: image capturing step), a step for accepting an input by an operator of a position of the target object T in the image (Step S13: input acceptance step), a step for calculating a feature amount for a pattern at the accepted position (Step S14: feature amount calculation step), and a step for, based on the feature amount calculated in the feature amount calculation step, setting a feature amount search range (Step S15: search range setting step).

In the imaging apparatus disposing step which is Step S11, for example by using the robot 20 to position the imaging apparatus 10, the target object T is made to enter within an image capturing range for the imaging apparatus 10. In the imaging apparatus disposing step, the target object T may be placed on a table, etc., but it is desirable to enter a state in which it is possible to capture from above a target object T having an estimated load shape, in other words a result of stacking a predetermined number of target objects T onto a pallet P in predetermined dispositions.

In the image capturing step which is Step S12, a captured image that includes a pattern belonging to the target object T is obtained by the imaging apparatus 10.

In the input acceptance step which is Step S13, the captured image obtained by the imaging apparatus 10 is displayed on a screen, and an input by an operator of a position for the target object T in the image on the screen is accepted. Input of positions for a plurality of target objects T in one image may be accepted.

In the feature amount calculation step which is Step S14, for example a publicly known technique such as binarization is used to cut up the captured image into a pattern region, in which an object is present within a predetermined distance range, and a background region. In addition, a publicly known technique such as blob analysis, for example, is used to calculate a feature amount for a pattern at the position designated in the input acceptance step, the feature amount being, for example, a surface area, a long-axis length, a short-axis length, etc.

In the search range setting step which is Step S15, an initial value for a feature amount search range is set based on one or more feature amounts calculated in the feature amount calculation step. As a concrete example, an average for a feature amount for a plurality of patterns calculated in the feature amount calculation step may be set to a median for the feature amount search range.

In this manner, by having the teaching unit 31, with which an operator can just specify a target object T on a screen to easily set an initial value for a feature amount search range, the robot system 1 can simply perform work to pick up a variety of target objects T.

The recognition unit 32, for example, uses a publicly known technique such as binarization to cut out a pattern region in which an object is present from a captured image obtained by the imaging apparatus 10, and uses blob analysis, etc. to calculate respective feature amounts for each pattern. The recognition unit 32 extracts, as a region for the target object T, a pattern belonging to which a calculated feature amount is within the search range. As a result, from among the plurality of target objects T stacked on the pallet P, the position of all the target objects T disposed in the uppermost level is specified.

The correction unit 33 resets the feature amount search range based on the feature amount for the pattern held by the target object T for which the recognition unit 32 specified the position thereof. Desirably, based on feature amounts for a group of target objects T having heights within a certain range—in other words feature amounts for target objects T in the uppermost level in the captured image, the correction unit 33 corrects the feature amount search range applied to specification of a position for a target object T below the group of target objects T—in other words a target object T in a next level, the entirety of which is exposed after the target objects T in the uppermost level in the captured image are picked up. As a result, it is possible to reflect a feature amount, which is for a squashed state due to stacking of the target objects T in each level, to the specification of a target object T in the next level, and thus it is possible to detect the target object T with comparative accuracy.

As a method for correcting a feature amount search range, it is possible to employ a method that changes a median for the search range instead of changing a range for the search range. Specifically, the correction unit 33 may set the median for a search range to an average for feature amounts belonging to the group of target objects T—in other words the target objects T in the uppermost level. By virtue of this method, it is possible to effectively correct a feature amount in a comparatively simple manner. Note that, although it is possible to support deformation by increasing the width of the search range, misdetections increase and thus it is desirable to not change the width of the search range.

The robot controller 40 receives, from the image processing apparatus 30, information regarding the position specified by the recognition unit 32 and controls operations by the robot 20 to hold a target object T by positioning the holding head 21 at the received position and cause the holding head 21, which holds the target object T, to move and thereby pick up the target object T from the pallet P. In response to an operation by the robot 20, the robot controller 40 instructs the image processing apparatus 30 to specify a position for a next target object T.

Similarly to the image processing apparatus 30, the robot controller 40 can be realized by introducing an appropriate control program into a computer apparatus that has a CPU, a memory, etc.

Figure 4:
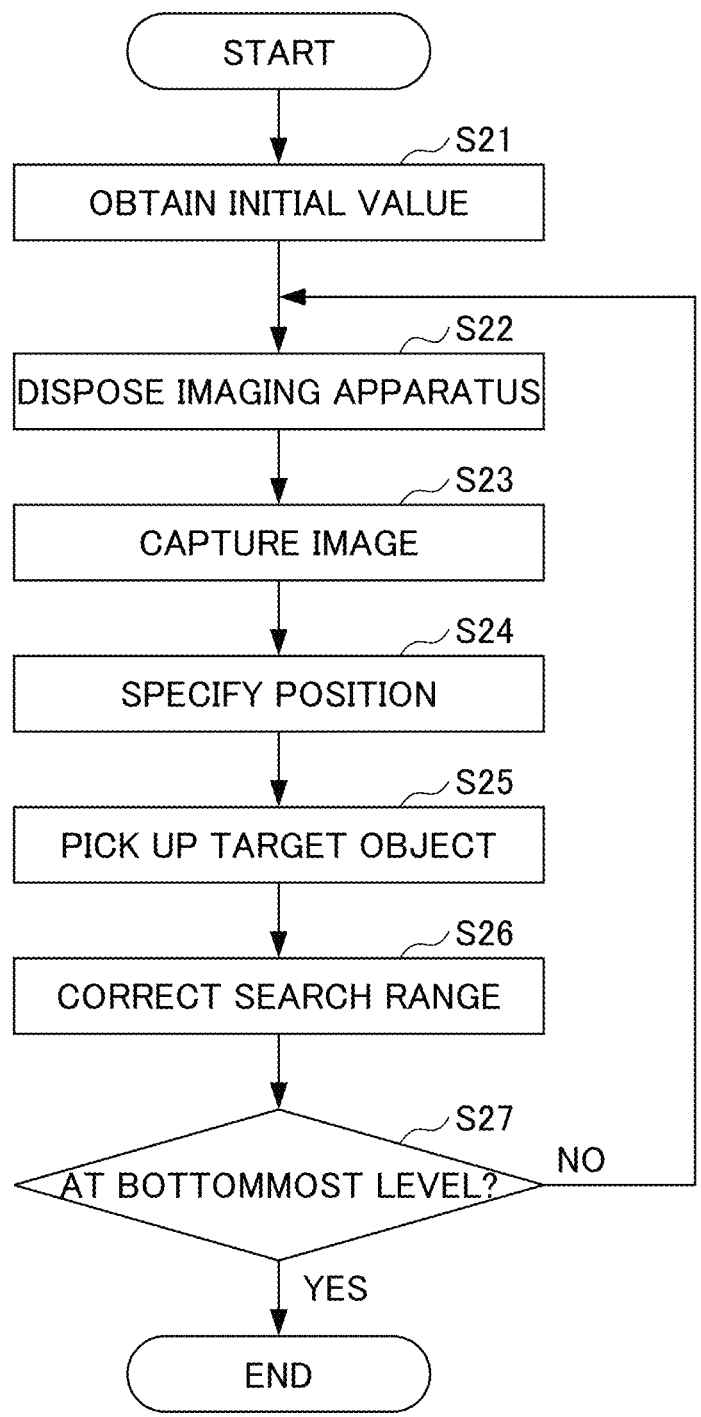
FIG. 4 is a flow chart that illustrates a procedure for a process for removing a target object in the robot system in FIG. 1.

FIG. 4 illustrates a procedure for a process for removing a target object T from the pallet P using the robot system 1. The process for removing a target object T is provided with a step for obtaining an initial value for a feature amount search range set by the teaching unit 31 (Step S21: initial value obtainment step), a step for disposing the imaging apparatus 10 (Step S22: imaging apparatus disposing step), a step for using the imaging apparatus 10 to capture an image of the target object T (Step S23: image capturing step), a step for using the recognition unit 32 to specify a position of the target object T (Step S24: position specifying step), a step for using the robot 20 to pick up the target object T having the specified position (Step S25: target object removal step), a step for using the correction unit 33 to correct the feature amount search range (Step S26: search range correction step), and a step for confirming whether the picked up target object T was in a bottommost level (Step S27: bottommost level confirmation step).

In the initial value obtainment step which is Step S21, the recognition unit 32 obtains, from the teaching unit 31, an initial value for a feature amount search range to be applied to a target object T that is to be picked up. As a concrete example, it is possible to have a configuration in which, when an operator inputs to the robot controller 40, for example, a code for specifying a type and a load shape (pallet pattern) for a target object T to be processed, the robot controller 40 instructs the recognition unit 32 to, for the inputted load shape for the target object T, obtain an initial value for the feature amount search range set by the teaching unit 31. In addition, in a case where a feature amount search range corresponding to a load shape for the target object T to be processed has not been set by the teaching unit 31, the operator may be prompted to use the teaching unit 31 to set a feature amount search range.

In the imaging apparatus disposing step which is Step S22, the robot 20 disposes the imaging apparatus 10 at a position where it is possible to capture an image of the target object T. This position for the imaging apparatus 10 may be constant or may be changed in alignment with the height of the target object T in the uppermost level at that time.

In the image capturing step which is Step S23, the imaging apparatus 10 captures an image that enables a target object T in the uppermost level at that time to be appropriately confirmed. As described above, this captured image is desirably a distance image. Accordingly, in the image capturing step, the imaging apparatus 10 may perform processing to generate a distance image by analyzing images from two cameras.

In the position specifying step which is Step S24, the recognition unit 32 analyzes the captured image obtained by the imaging apparatus 10, and extracts a pattern belonging to which a feature amount is within the search range as a pattern belonging to the target object T. The recognition unit 32 then calculates the position and orientation of the target object T, and inputs calculated positions and orientations for all target objects T to the robot controller 40.

In the target object removal step which is Step S25, the robot controller 40 causes the robot 20 to operate so as to cause the holding head 21 to move to a position at which it is possible to hold the target object T for which the position thereof was inputted to the recognition unit 32, and causes the robot 20 to operate so as to cause the holding head 21 to hold the target object T at that position and cause the holding head 21, holding the target object T, to move and thereby pick up the target object T from the pallet P. The robot controller 40 controls the robot 20 to release the target object T picked up from the pallet P by placing this target object T onto a conveyor (not shown), for example. An operation for removing the target object T is executed in order one-by-one for all target objects T inputted from the recognition unit 32.

In the search range correction step which is Step S26, as described above, based on a feature amount for a pattern extracted by the recognition unit 32 as a pattern belonging to the target object T in the most recent captured image, the correction unit 33 corrects the feature amount search range stored by the recognition unit 32.

In the bottommost level confirmation step which is Step S27, confirmation is made as to whether the most recent captured image is a result of capturing target objects T in the bottommost level on the pallet P. Whether the target objects T are in the bottommost level can be determined using the height position of the target objects T for which the position was specified. If the most recent captured image results from capturing target objects T in the bottommost level on the pallet P, it can be considered that all target objects T on the pallet P have been picked up, and thus the process for this pallet P ends. If the most recent captured image is not a result of capturing target objects T in the bottommost level on the pallet P, the imaging apparatus disposing step which is Step S22 is returned to in order for target objects T in the next level to be picked up.

Figure 5:
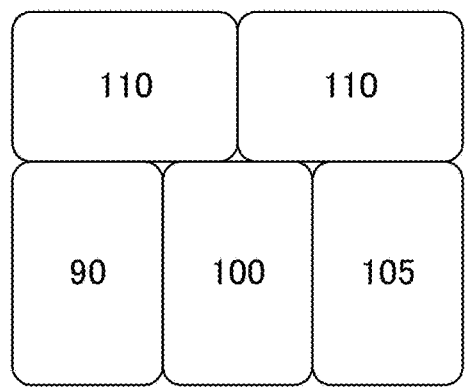
FIG. 5 is a view that exemplifies feature amounts for target objects in an Nth level that are picked up by the robot system in FIG. 1.
Figure 6:
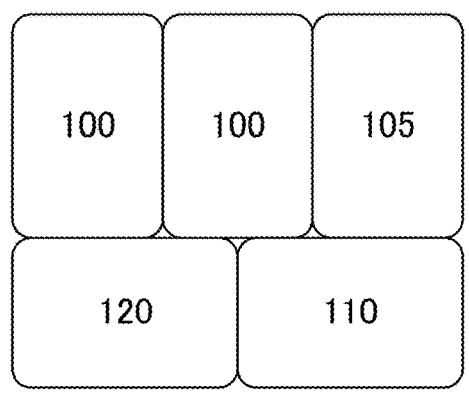
FIG. 6 is a view that exemplifies feature amounts for target objects in an (N-1)th level that are picked up by the robot system in FIG. 1.
Figure 7:
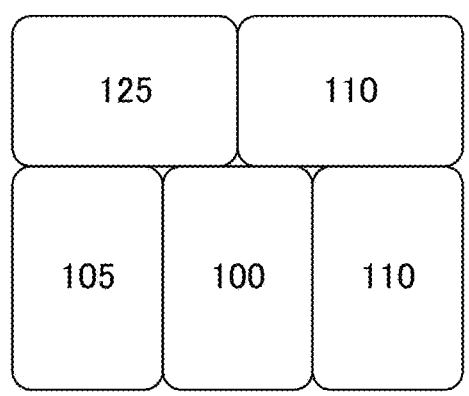
FIG. 7 is a view that exemplifies feature amounts for target objects in an (N-2)th level that are picked up by the robot system in FIG. 1.

FIGS. 5 to 7 exemplify a feature amount for a pattern in a captured image for target objects T in, respectively, an Nth level (uppermost level), an (N-1)th level (one level below the uppermost level), and an (N-2)th level (two levels below the uppermost level). In this example, a short-axis length of a pattern is used as a feature amount.

Because the target objects T are not squashed in the Nth level, the short-axis length of a target object T has substantially not changed from a value for when the target object T was initially disposed and is substantially equal to the short-axis length of the target object T for when the feature amount was set in the teaching unit 31. A median for an initial value for short-axis length search range is 100. For example, assuming that a lower limit and an upper limit that are set with ±3σ (three times a standard deviation) are respectively 80 and 120, the short-axis lengths for target objects T in the uppermost level of course fall within this lower limit and upper limit. In the (N−1)th level, the short-axis lengths slightly increase as a result of each target object T therein being vertically compressed due to the weight of the target objects T in the uppermost level, but, in this example, just barely fall within the lower limit and the upper limit that were set with the uppermost level being envisioned. However, in the (N−2)th level, as a result of each target object T being vertically compressed due to the weight of the target objects T in the two levels thereabove, the short-axis lengths of some target objects T in the (N−2)th level become greater than the upper limit which was set by envisioning the uppermost level. Accordingly, when the feature amount search range is made to be constant, there are cases where it is not possible to appropriately detect a target object T in a lower level.

In a case where the correction unit 33 sets an average for the short-axis length of patterns for target objects T in each level as the median for a search range for the next level, the search range for the Nth level becomes between 80 to 120 inclusive (median: 100), the search range for the (N−1)th level becomes between 81 to 121 inclusive (median: 101), and the search range for the (N−2)th level becomes between 87 to 127 inclusive (median: 107). In this case, the maximum value for the short-axis length from among patterns in the (N−2)th level becomes 125, but this is still within the search range, and thus it is possible to extract patterns for all of the target objects T, and it is possible to use the robot 20 to appropriately pick up all of the target objects T.

As above, when removing target objects T in the same level, the robot system 1 reflects a feature amount for a pattern extracted as a target object T and corrects a feature amount search range for specifying patterns for target objects T in one level lower to thereby be able to compensate for the width and surface area of a pattern increasing in captured images due to target objects T being more squashed the lower the level for the target objects T, and be able to appropriately recognize the target objects T.

Description was given above regarding an embodiment for a robot system according to the present disclosure, but the scope of the present disclosure is not limited to the embodiment described above. In addition, effects set forth in the embodiment described above merely list the most suitable effects that arise from the robot system according to the present disclosure. Effects due to the robot system according to the present disclosure are not limited to those set forth in the embodiment described above.

As a concrete example, in the process for removing target objects by the robot system described above, the target object removal step and the search range correction step may be switched in order or may be executed at the same time.

In addition, the robot system according to the present disclosure may be configured such that processing ends in a case where it is not possible to discover a pattern belonging to a target object in a captured image after the position specifying step.

EXPLANATION OF REFERENCE NUMERALS

1 Robot system
10 Imaging apparatus
20 Robot
21 Holding head
30 Image processing apparatus
31 Teaching unit
32 Recognition unit
33 Correction unit
40 Robot controller
P Pallet
T Target object

The invention claimed is:

1. A robot system, comprising:
an imaging apparatus configured to capture an image of a target object;
a robot configured to pick up the target object;
an image processing apparatus configured to, based on the image captured by the imaging apparatus, specify a position of the target object; and
a robot controller configured to cause the robot to pick up the target object having the position specified by the image processing apparatus,
wherein
the image processing apparatus has
a teaching unit configured to set a search range in which it is possible to obtain a feature amount for a pattern belonging to the target object in the image captured by the imaging apparatus,
a recognition unit configured to extract the pattern having the feature amount within the search range in the image captured by the imaging apparatus, and
a correction unit configured to, based on the feature amount for the pattern extracted by the recognition unit, correct the search range.

2. The robot system according to claim 1, wherein the correction unit changes a median for the search range without changing a width for the search range.

3. The robot system according to claim 1, wherein, based on feature amounts for a group of the target objects having a height within a certain range, the correction unit corrects the search range to be applied to an instance of the target object below the group of the target objects.

4. The robot system according to claim 3, wherein the correction unit sets an average for feature amounts for the group of the target objects to a median for the search range.

5. The robot system according to claim 1, wherein the imaging apparatus obtains a distance image for the target object.

* * * * *